(12) United States Patent
Nonogaki et al.

(10) Patent No.: US 7,082,919 B2
(45) Date of Patent: Aug. 1, 2006

(54) MOUNTING STRUCTURE FOR ENGINE COVER

(75) Inventors: Haruhiko Nonogaki, Aichi (JP); Itsuro Maeda, Aichi (JP); Masahiro Ogata, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 107 days.

(21) Appl. No.: 10/808,525

(22) Filed: Mar. 25, 2004

(65) Prior Publication Data
US 2004/0187838 A1  Sep. 30, 2004

(30) Foreign Application Priority Data
Mar. 28, 2003 (JP) ............................ P2003-092056
Mar. 28, 2003 (JP) ............................ P2003-092296
Dec. 17, 2003 (JP) ............................ P2003-419779

(51) Int. Cl.
*F02B 77/11* (2006.01)
(52) U.S. Cl. ................................................. 123/198 E
(58) Field of Classification Search ............ 123/198 E
See application file for complete search history.

(56) References Cited

U.S. PATENT DOCUMENTS

RE31,635 E * 7/1984 Smith et al. ................ 403/144
6,206,604 B1  3/2001 Dembowsky et al.

FOREIGN PATENT DOCUMENTS

JP  UM-S55-67329  11/1956
JP  A-2000-203378  7/2000

* cited by examiner

Primary Examiner—Noah P. Kamen
(74) Attorney, Agent, or Firm—Posz Law Group, PLC

(57) ABSTRACT

A mounting structure for an engine cover includes: a protruded member which has a neck and a head with a larger diameter than the neck; and a recessed member which has an external circumferential surface small diameter section to be locked to a mounting hole of a mounting seat arranged so as to be opposed to the protruded member, and a concave holding the head of the press-fit protruded member. In the protruded member, at least a portion surrounding the concave is formed solid. The head is arranged closer to a rear surface of the engine cover than the mounting hole. A compression space, which is compressed in the case in which a collision load equal to or larger than a predetermined value is applied in a front and rear direction of the engine cover, is defined between the recessed member and the rear surface of the engine cover.

15 Claims, 14 Drawing Sheets

PRIOR ART

MOUNTING STRUCTURE FOR ENGINE COVER

This application is based on Japanese Patent Applications No. 2003-092296, 2003-092056 and 2003-419779, which are incorporated herein by reference.

BACKGROUND OF THE INVENTION

1. Field of the Invention

The present invention relates to an engine cover for protecting a surface of an engine.

2. Description of the Related Art

An engine cover is arranged on, for example, an upper surface of a cylinder head of an engine. For maintenance of the engine, the engine cover needs to be detachably mounted to the engine. Therefore, a mounting structure including a protruded member and a recessed member, as described in U.S. Pat. No. 6,206,604 for example, is often used.

FIG. 14 shows a sectional view of a mounting structure for an engine cover including a protruded member and a recessed member (hereinafter abbreviated as "mounting structure" according to circumstances). A protruded member 101 of a mounting structure 100 is made of metal and presents a bolt shape. The protruded member 101 includes a screw section 103, a neck 104, and a head 105. The screw section 103 is screwed into an upper surface of a cylinder head 102. The neck 104 is arranged above the screw section 103. The head 105 is arranged above the neck 104. The head 105 presents a spherical shape. The head 105 has a larger diameter than the neck 104.

The recessed member 106 is made of rubber and presents a thin cup shape opening downward. The recessed member 106 is locked to a tip of a mounting seat 109 which is vertically provided from a lower surface of an engine cover 108. A concave 107 of a spherical shape in its back is arranged substantially in a center in a radial direction of the recessed member 106. The head 105 is press-fitted in the concave 107.

According to the mounting structure 100, the engine cover 108 can be mounted to the cylinder head 102 by press-fitting the head 105 into the concave 107. In addition, the engine cover 108 can be detached from the cylinder head 102 by pulling the head 105 out of the concave 107.

Incidentally, a clearance 110 is provided between the concave 107 of the recessed member 106 and an external surface 111. If the clearance 110 is provided, the concave 107 easily expands when the protruded member 101 is press-fitted into the recessed member 106. Therefore, a press-fit resistance is reduced. However, if the clearance 110 is provided, a thickness of a portion surrounding the concave 107 of the recessed member 106 is reduced. Consequently, it is likely that the head 105 breaks through the portion surrounding the concave 107 of the recessed member 106 at the time of mounting work of the engine cover 108.

In addition, since the press-fit resistance is low, the head 105 easily slips out of the concave 107 due to engine drive vibration or the like after the engine cover 108 is mounted. In other words, the protruded member 101 easily slips out of the recessed member 106. That is, the engine cover 108 drops off easily.

Further, the clearance 110 acts as a swing allowance of the head 105 after the engine cover 108 is mounted. In other words, the head can relatively swing by the clearance 110. Consequently, it is likely that the engine cover 108 becomes unsteady with respect to the cylinder head 102 due to engine drive vibration or the like.

Therefore, JP-UM-A-55-67329 introduces a mounting structure in which an engine cover is mounted to a cylinder block in a state in which a head of a protruded member projects to a side of a front surface of the engine cover. FIG. 15 shows a sectional view of another mounting structure described in the reference. Note that portions corresponding to those in FIG. 14 are denoted by the same reference numerals. A mounting hole 112 is opened in the engine cover 108. A rubber ring 113 is fit into an internal circumference side of the mounting hole 112. The protruded member 101 is vertically provided on the surface of the cylinder block 114. The protruded member 101 is press-fitted on an internal circumference side of the rubber ring 113. The head 105 projects to the side of the front surface of the engine cover 108. An internal circumferential surface of the rubber ring 113 is in pressed contact with the neck 104.

According to the mounting structure 100 described in JP-UM-A-55-67329, the neck 104 is tightened by the rubber ring 113 which is compressed between the neck 104 and the mounting hole 112. Thus, the neck 104, that is, the protruded member 101 does not easily slip out of the rubber ring 113. In other words, the engine cover 108 does not drop off easily. In addition, the unsteadiness of the engine cover 108 due to the engine drive vibration is also small. In other words, the mounting structure has high vibration damping properties.

However, according to the mounting structure 100 described in JP-UM-A-55-67329, the head 105 projects to the side of the front surface of the engine cover 108. Thus, its appearance is degraded. In addition, the uneasiness of the protruded member 101 to slip out of the rubber ring 113 and the high vibration damping properties depend upon the thickness of the rubber ring 113. In other words, in the case in which the rubber ring 113 is thin, the rubber ring 113 curves excessively between the internal circumferential surface of the mounting hole 112 and the external circumferential surface of the neck 104. Thus, a press-contacting force applied to the neck 104 from the rubber ring 113 is reduced.

Incidentally, in recent years, from the need to protect pedestrians, a shock absorbing space is often secured between a hood panel and an engine side member in an engine room. For example, in the case in which an object of collision such as a pedestrian is hit to fall on the hood panel, the hood panel sinks by the shock absorbing space. Collision energy of the object of collision is absorbed by this sinking of the hood panel. A width of the shock absorbing space and an amount of collision energy absorption are proportional to each other. Therefore, it is desirable that the shock absorbing space is as large as possible.

However, an engine cover is disposed above the engine side member as described above. In other words, the engine cover occupies a part of the shock absorbing space. Therefore, the amount of collision energy absorption decreases by the space occupied by the engine cover.

Thus, JP-A-2000-203378 introduces an engine cover in which shock absorbing means is integrally formed. The shock absorbing means is arranged between a front surface of the engine cover and a rear surface of a hood panel. In other words, the shock absorbing means occupies a part of a shock absorbing space. As described above, in the case in which an object of collision is hit to fall on the hood panel, the hood panel sinks. At this point, the shock absorbing means is destroyed by collision energy. In other words, the collision energy is converted into destruction energy. The collision energy of the object of collision is absorbed by this energy conversion.

Incidentally, the engine cover is a member projecting largely in the engine room. Thus, impression of the entire engine room changes significantly depending upon a degree of a design characteristic of the engine cover. Therefore, the engine cover described in the reference has a degraded appearance.

In addition, ports such as an engine oil inlet are often opened in the engine cover. These ports are required to be opened in portions corresponding to ports on the engine side on a rear side of the engine cover, respectively. Consequently, if the shock absorbing means is arranged on the front surface of the engine cover, it becomes difficult to open the ports in the predetermined portions. Thus, it is difficult to open the ports in the engine cover described in JP-A-2000-203378.

SUMMARY OF THE INVENTION

An object of the present invention is to provide a mounting structure for an engine cover which has high durability, does not allow the engine cover to drop off easily, has high vibration damping properties, and has a favorable appearance.

The mounting structure for an engine cover of the invention includes: a protruded member which is provided protrudingly from a front surface of an engine side member and has a neck and a head with a larger diameter than the head; and a recessed member which has an external circumferential surface small diameter section to be locked to a mounting hole of a mounting seat, which is arranged so as to be opposed to the protruded member, on a rear surface side of the engine cover, a press-fit passage holding the head of the press-fit protruded member on an internal circumference side of the external circumferential surface small diameter section, and a concave communicating with a depth end of the press-fit passage and defining a holding space for holding the head of the press-fit protruded member, wherein in the protruded member, at least a portion surrounding the concave is formed solid; in a press-fit position, the head is arranged closer to the rear surface of the engine cover than the mounting hole; and when it is assumed that an inner diameter of the mounting hole is D1, an outer diameter of the head is D2, an outer diameter of the external circumferential surface small diameter section before locking the mounting hole is D3, and an inner diameter of the press-fit passage before press-fitting the protruded member is D4, D1, D2, D3, and D4 satisfy an inequality D1<D2+(D3−D4).

In short, in the mounting structure of the invention, at least the portion surrounding the concave of the recessed member is formed solid. In other words, at least the clearance 110 in FIG. 14 is filled. According to the mounting structure of the invention, the thickness of the portion surrounding the concave is increased. Therefore, at the time of mounting work of the engine cover, it is less likely that the head breaks through the portion surrounding the concave. In other words, the mounting structure has high durability.

In addition, since the portion surrounding the concave is thick, the protruded member does not easily slip out of the recessed member after the engine cover is mounted. Therefore, the engine cover does not drop off easily. Further, the vicinity of the concave is formed solid and has no clearance equivalent to the clearance 110 of FIG. 14. Consequently, there is no swing allowance of the head due to such a clearance. Therefore, it is less likely that the engine cover becomes unsteady due to the engine drive vibration or the like. In other words, the mounting structure has high vibration damping properties. In addition, the head does not project to the side of the front surface of the engine cover after the engine cover is mounted. Consequently, the mounting structure is favorable in appearance in terms of design.

Further, according to the mounting structure of the invention, the head is arranged closer to the rear surface of the engine cover than the mounting hole in the press-fit position. Moreover, D1, D2, D3, and D4 are set so as to satisfy an inequality D1<D2+(D3−D4). Consequently, the head is regulated by the mounting hole when it passes through the press-fit passage. In other words, an interference is generated. In this regard, again, according to the mounting structure of the invention, the protruded member does not easily slip out of the recessed member after the engine cover is mounted.

It is preferable to set a press-fit rate (%)=(D2−(D1−(D3−D4)))/(D3−D4)×100 in a range from 2% to 35%. Here, the press-fit rate is preferably 2% or more because, in the case in which it is less than 2%, if a dimensional fluctuation of the respective members is taken into account, a difference of dimensions between the inner diameter of the press-fit passage and the outer diameter of the neck is relatively large when a difference of dimensions of the outer diameter of the head and the outer diameter of the neck of the protruded member is a defined value, and a function for controlling the unsteadiness of the protruded member and the recessed member is weakened. In addition, this is also because the protruded member easily slips out of the recessed member.

On the other hand, the press-fit rate is preferably 35% or less because, in the case in which it exceeds 35%, a large load is required when the protruded member is inserted into the recessed member, and it becomes difficult to mount the engine cover.

It is preferable to set a thickness rate (%)=(D3−D4)/(2×D2)×100 in a range from 40% to 80%. Here, the thickness rate is preferably 40% or more because, in the case in which it is less than 40%, since a load suddenly increases when the neck and an inner surface of the press-fit passage interfere with each other in the radial direction, an allowance with respect to positional accuracy and vibration is lost.

On the other hand, the thickness rate is preferably 80% or less because, in the case in which it exceeds 80%, since a load does not increase contrary to the above, it is difficult to control unsteadiness.

It is preferable to configure the mounting structure such that a leak hole, which permits the fair compressed by press-fitting in the protruded member to escape from the holding space to the outside, is drilled in the portion surrounding the concave. When the protruded member is press-fitted in the recessed member, the air without any place to escape in the recessed member is compressed in the holding space. This compressed air acts as a press-fit resistance of the protruded member.

Thus, the leak hole is drilled in the portion surrounding the concave of the recessed member of this structure. The leak communicatively connects the holding space and the outside of the recessed member. Consequently, according to this constitution, the air compressed in the holding space can be permitted to escape to the outside through the leak hole. Therefore, the press-fit resistance at the time when the protruded member is press-fitted is reduced.

It is preferable to form such that a taper surface, which tapers along with the direction of press-fitting of the protruded member, is continued so that the protruded member can be press-fitted at a slant against the recessed member in the front side of the press-fit passage of the protruded member.

Depending on the positional relationship of the engine cover and the engine side member, there is a case in which axes of protruded part are not disposed in parallel. In the case, any axes of the protruded member and the recessed member are intersected. Even in the case, according to this embodiment, the taper surface is formed so that the protruded member is press-fitted at a slant against the recessed member. Thus, according to this structure, mounting structure is commoditized among plural type of vehicles. Therefore, the production cost of mounting structure is reduced by mass-producing.

According to the invention, the mounting structure for an engine cover which has high durability, does not allow the engine cover to drop off easily, has high vibration damping properties, and has a favorable appearance is provided.

Another object of the present invention is to provide an engine cover which has a large amount of collision energy absorption and a high design characteristic, and in which ports are opened easily.

The engine cover of the invention includes: a cover body which covers an engine side member having an engine side engagement section arranged on a front surface thereof; a mounting seat which has a seat body arranged so as to be opposed to the engine side engagement section on a rear side of the cover body and a coupling section coupling the seat body and the cover body; and a cover side engagement section which is locked to the seat body and engages with the engine side engagement section, wherein a compression space, which is compressed in the case in which a collision load equal to or larger than a predetermined value is applied in a front and rear direction of the cover body, is defined between the cover side engagement section and the rear surface of the cover body.

In short, the engine cover of the invention defines the compression space on the rear surface side thereof. The engine cover includes the cover body, the mounting seat, and the cover side engagement section. The mounting seat includes the seat body and the coupling section. The seat body is arranged on the rear side of the cover body. The coupling section couples the seat body and the cover body. The cover side engagement section is locked to the seat body. On the other hand, the engine side engagement section is arranged on the engine side member. The cover side engagement section and the engine side engagement section engage with each other, whereby the engine cover is locked to the engine side member. The compression space is defined between the cover side engagement section and the rear surface of the cover body.

When a collision load equal to or larger than the predetermined value is applied in a direction from the front side to the rear side of the cover body, that is, a front and rear direction, the compression space is compressed. Collision energy is absorbed by this compression.

According to the engine cover of the invention, the shock absorbing space, which has decreased by the space occupied by the engine cover, can be partially recovered by the compression space. Consequently, an amount of collision energy absorption increases by the compression space.

In addition, according to the engine cover of the invention, since the amount of collision energy absorption is large, the arrangement of the shock absorbing means is not essential. Therefore, the engine cover of the invention has a high design characteristic. Further, in the engine cover of the invention, the ports are opened easily.

Moreover, the compression space of the engine cover of the invention is defined using the mounting seat. In other words, the mounting seat has both a role of locking the engine cover to the engine side member and a role of defining the compression space. Therefore, according to the engine cover of the invention, a fewer number of components are sufficient compared with the case in which components for defining the compression space are arranged separately from the mounting seat.

Preferably, the cover side engagement section is an elastic cover side engagement section which starts elastic deformation when a collision load smaller than the predetermined value is applied thereto. According to this constitution, the collision energy can be absorbed by the elastic deformation of the elastic cover side engagement section in addition to the compression of the compression space. Consequently, the amount of collision energy absorption is increased.

In addition, in the case in which the collision energy is small, the entire amount of collision energy can be absorbed only by the elastic deformation of the elastic cover side engagement section. Therefore, the collision energy can be absorbed without compressing the compression space.

Preferably, at least one of the seat body and the coupling section is constituted to have a fragile portion which is destroyed in the case in which a collision load equal to or larger than the predetermined value is applied thereto. Rigidity of the fragile portion is set lower than rigidity of portions other than the fragile portion in the seat body and the coupling section. Consequently, when the collision load equal to or larger than the predetermined value is applied, the fragile portion is destroyed preferentially over the other portions. As the fragile portion is destroyed, the compression space is compressed. Then, the collision energy is absorbed.

According to this constitution, the fragile portion with low rigidity is intentionally arranged, whereby the compression space can be operated surely. In addition, in the case in which plural mounting seats are arranged, all compression spaces can be operated with substantially the same collision load simply by arranging the same fragile portion in all the mounting seats. Further, according to this constitution, an operation load of the compression space can be set freely by adjusting a destruction load of the fragile portion.

DETAILED DESCRIPTION OF PREFERRED EMBODIMENTS

An embodiment of a mounting structure for an engine cover of the present invention will be hereinafter described.

FIRST EMBODIMENT

Figure 1:
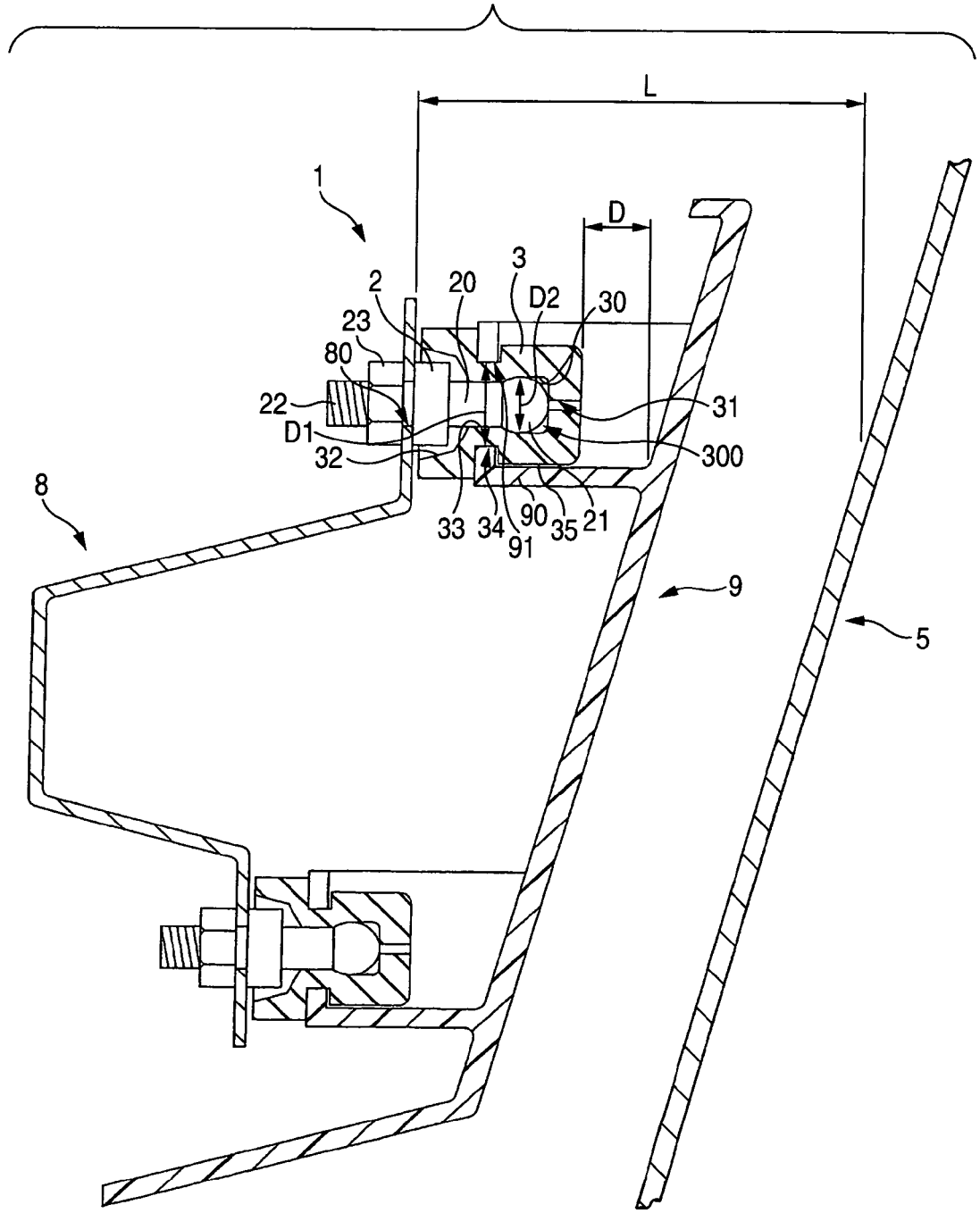
FIG. 1 is a sectional view of a mounting structure for an engine cover in a first embodiment of the invention.
Figure 2:
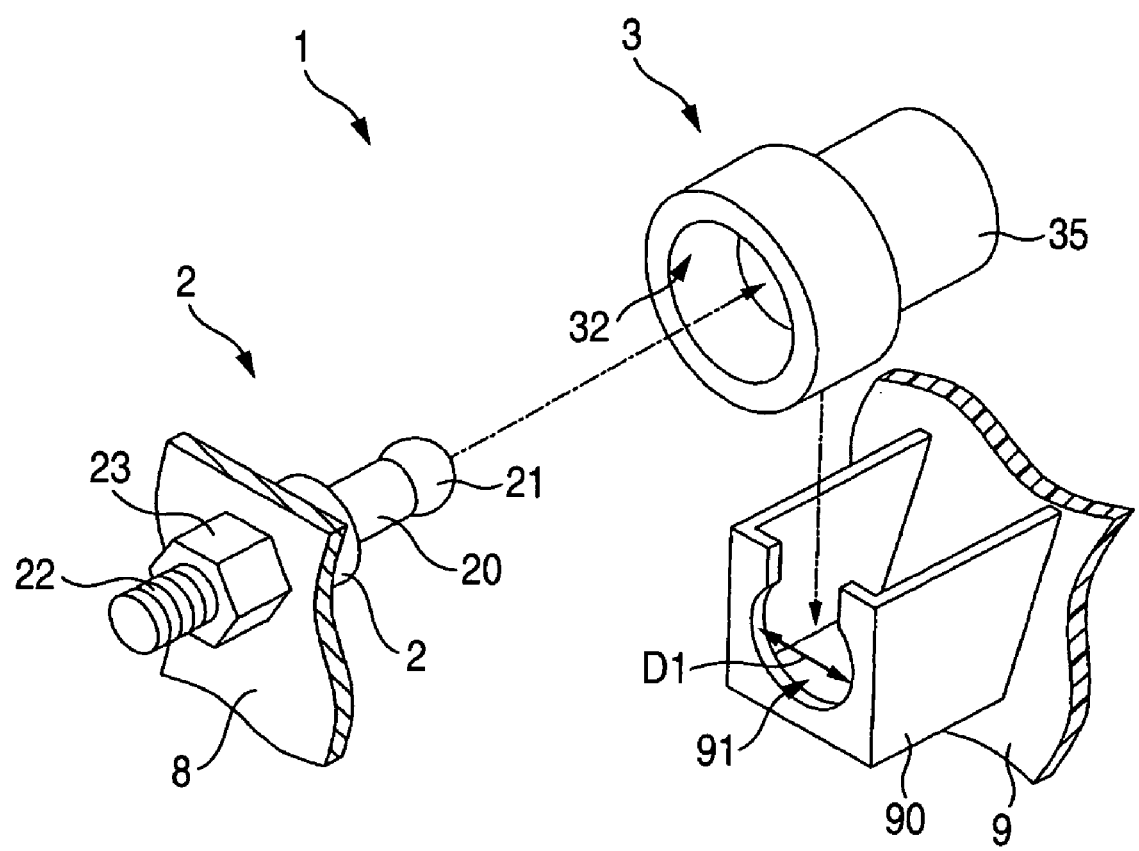
FIG. 2 is an exploded view of the mounting structure which is arranged in an upper part in FIG. 1.

First, a constitution of the mounting structure in this embodiment will be described. FIG. 1 shows a sectional view of the mounting structure in this embodiment. In addition, FIG. 2 shows an exploded view of the mounting structure in this embodiment.

As shown in the figures, a mounting structure 1 is arranged between a bracket 8 and an engine cover 9. In addition, there are four mounting structures 1 in total arranged in the vertical direction so as to be apart from each other. The four mounting structures 1 have the same constitution, respectively. Therefore, one mounting structure 1 of the two mounting structures 1 arranged in an upper part of the mounting structure 1 will be described here.

The bracket 8 is contained in an engine side member of the invention. The bracket 8 is made of metal and presents a curved plate shape. The bracket 8 is fixed to a cylinder block (not shown). Four upper and lower screw holes 80 are drilled in the bracket 8.

The engine cover 9 is made of resin and presents a shallow tray shape. Four upper and lower mounting seats 90 are provided protrudingly from a rear surface of the engine cover 9. The mounting seat 90 presents a box shape with an upper surface thereof opened. Amounting hole 91 of a keyhole shape opening upwards is formed on a tip wall of the mounting seat 90.

The mounting structure 1 includes a protruded member 2 and a recessed member 3. The protruded member 2 is made of metal and presents a bolt shape. The protruded member 2 includes a neck 20, a head 21, and a screw section 22. The screw section 22 is inserted into a screw hole 80 of the bracket 8 from a front surface side of the bracket 8. A nut 23 is screwed onto the screw section 22. The protruded member 2 is provided protrudingly to the front surface side of the bracket 8 by this screw-up. The head 21 forms a tip of the protruded member 2. The head 21 presents a spherical shape. The neck 20 of a columnar shape extends on a base side of the head 21. A maximum diameter of the head 21 is set to be larger than a diameter of the neck 20. In other words, the head 21 has a larger diameter than the neck 20.

The recessed member 3 is made of rubber and presents a cylindrical shape opening at one end thereof, that is, a cup shape. The recessed member 3 includes a concave 31, a leak hole 31, an opening 32, a press-fit passage 33, and an external circumferential surface small diameter section 34. The external circumferential surface small diameter section 34 is formed on an external circumferential surface of the recessed member 3. The external circumferential surface small diameter section 34 is press-fitted in a mounting hole 91, whereby the recessed member 3 is locked to the mounting seat 90.

The opening 32 is formed on an end face on the bracket 8 side of the recessed member 3. The opening 32 presents a conical shape. The press-fit passage 33 has a columnar shape and is defined in a depth direction of the opening 32. The neck 20 is contained in the press-fit passage 33. The concave 30 presents a spherical surface on its back. A spherical space 300 defined by the concave 30 is defined in a depth direction of the press-fit passage 33. The spherical space 300 is included in the holding space of the invention. In other words, the opening 32, the press-fit passage 33, and the spherical space 300 are communicatively connected with each other in this order from the end face on the bracket 8 side of the recessed member 3 to the depth direction. The head 21 is contained in the spherical space 300. The head 21 is tightened by the concave-30. An entrance of the leak hole 31 opens to the concave 30. An exit of the leak hole 31 opens to an external surface 35. The spherical space 300 is communicatively connected to the outside by the leak hole 31.

Figure 16:
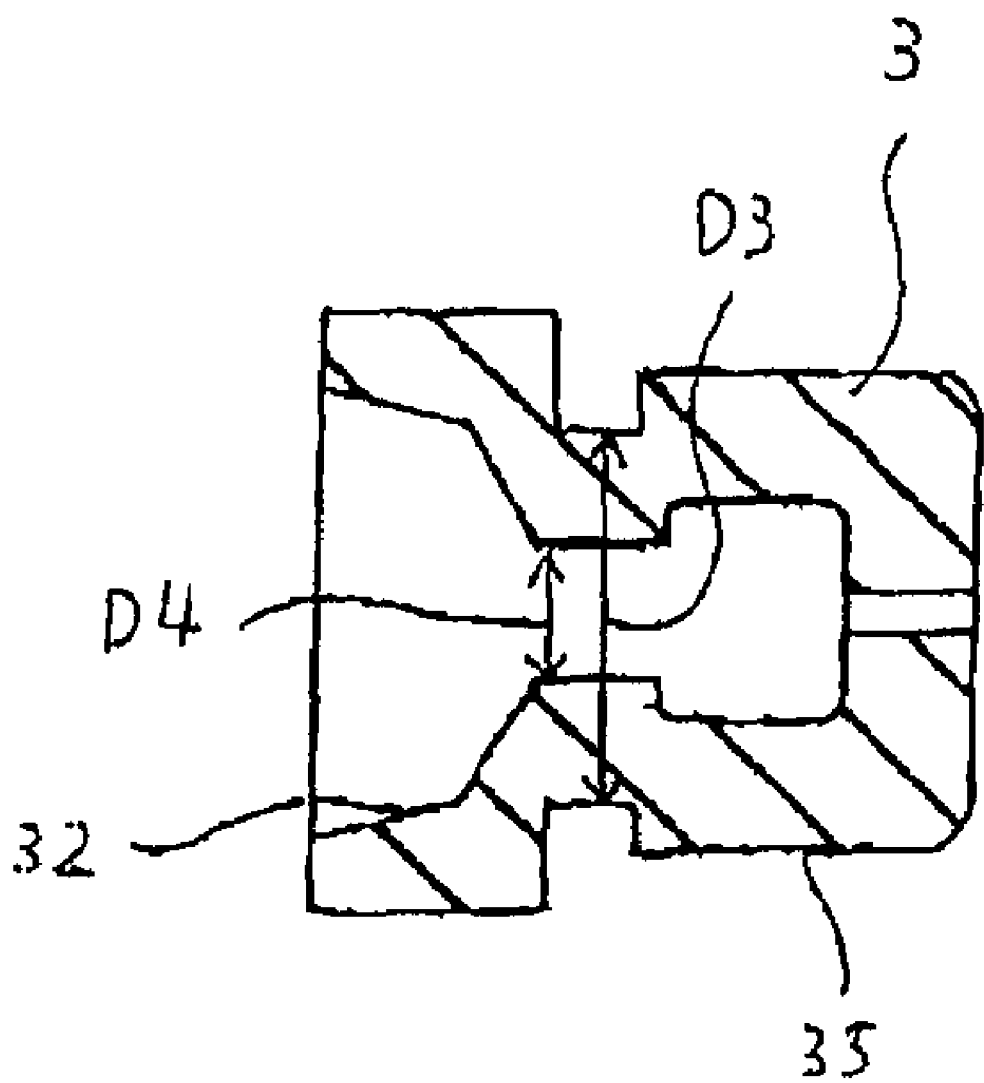
FIG. 16 is a sectional view of a portion of a mounting structure of one or more embodiments.

Next, a movement at the time when the protruded member is press-fitted in the recessed member will be described. An inner diameter of the mounting hole 91 (D1 of the invention), an outer diameter of the head 21 (D2 of the invention), an outer diameter of the external circumferential surface small diameter section 34 (D3 of the invention), and an inner diameter of the press-fit passage 33 before pressfitting the protruded member 2 (D4 of the invention) are set to φ15 mm (tolerance: ±0.1 mm), φ8 mm (tolerance: ±0.3 mm), φ 15.5 mm (tolerance: ±0.4 mm), and φ7 mm (tolerance: ±0.5 mm), respectively. D2 and D3 are illustrated, for example, in FIG. 16, a sectional view of the recessed member 3 of the mounting structure of the embodiment illustrated in FIG. 2.

In other words, D1, D2, D3, and D4 are set so as to satisfy an inequality D1 (=15 mm)<D2+(D3−D4) (=16.5 mm) (excluding the tolerance). In addition, the head 21 is arranged closer to the rear surface of the engine cover 9 than the mounting hole 91 in the press-fit position. Therefore, the head 21 is regulated by a hole edge of the mounting hole 91 when it passes through the press-fit passage 33. In other words, an interference is generated. After passing through the press-fit passage 33, the head 21 is released from this interference. Further, the head 21 is contained in the spherical space 300 and tightened by the concave 30. Moreover, the neck 20 is contained in the press-fit passage 33.

In addition, at the time of the press-fit, the head 21 of the protruded member 2 passes through the opening 32 and the press-fit passage 33 in order. As the head 21 passes, the air in the opening 32 and the press-fit passage 33 is driven away to the spherical space 300. This air is discharged to the outside via the leak hole 31.

According to the mounting structure 1 in this embodiment, a portion surrounding the recessed member 3 and the concave 30 is formed solid. More specifically, a portion from the concave 30 to the external surface 35 is formed solid. Therefore, a portion surrounding the concave 30 is thick. Consequently, it is less likely that the head 21 breaks through the portion surrounding the concave 30 at the time of mounting work of the engine cover 9. In other words, the mounting structure 1 has high durability.

In addition, since the portion surrounding the concave 30 is thick, the protruded member 2 does not easily slip out of the recessed member 3 after the engine cover 9 is mounted. Therefore, the engine cover 9 does not drop off easily. In addition, the portion surrounding the concave 30 is formed solid, and there is no clearance (see the clearance 110 in FIG.

3) around the concave 30. Therefore, it is less likely that the engine cover 9 becomes unsteady due to engine drive vibration or the like. In other words, the mounting structure 1 has high vibration damping properties. Further, the head 21 does not project to the side of the front surface of the engine cover 9 after the engine cover 9 is mounted. Consequently, the mounting structure 1 is favorable in appearance in terms of design.

In addition, according to the mounting structure 1 in this embodiment, the leak hole 31 is drilled in the portion surrounding the concave 30 of the recessed member 3. Consequently, the air compressed in the spherical space 300 can be permitted to escape to the outside through the leak hole 31. Therefore, a press-fit resistance at the time when the protruded member 2 is press-fitted is small.

In addition, according to the mounting structure 1 in this embodiment, the head 21 is tightened by the concave 30. In this regard, again, the protruded member 2 does not easily slip out of the recessed member 3 after the engine cover 9 is mounted. Further, according to the mounting structure 1 in this embodiment, the opening 32 presents a conical shape. Consequently, positioning at the time when the protruded member 2 is press-fitted is easy.

Further, according to the mounting structure 1 in this embodiment, as described above, D1, D2, D3, and D4 are set so as to satisfy the inequality D1<D2+(D3−D4). In addition, the head 21 is arranged closer to the rear surface of the engine cover 9 than the mounting hole 91 in the press-fit position Consequently, the head 21 is regulated by the mounting hole 91 when the head 21 passes through the press-fit passage 33. In other words, an interference is generated. Consequently, it is less likely that the head 21, which is once held in the spherical space 300, passes through the press-fit passage 33 and drops off from the opening 32. In this regard, again, according to the mounting structure 1 in this embodiment, the protruded member 2 does not easily slip out of the recessed member 3 after the engine cover 9 is mounted.

Moreover, according to the mounting structure 1 in this embodiment, the press-fit rate is set to approximately 17.6% (excluding the tolerance). In addition, the thickness rate is set to approximately 53.1% (excluding the tolerance). Consequently, a press-fit load becomes appropriate, and the unsteadiness of the engine cover 9 can be controlled to be small.

SECOND EMBODIMENT

This embodiment is different from the first embodiment in that a taper surface is formed in the front side of a press-fit passage of a recessed member.

Figure 3:
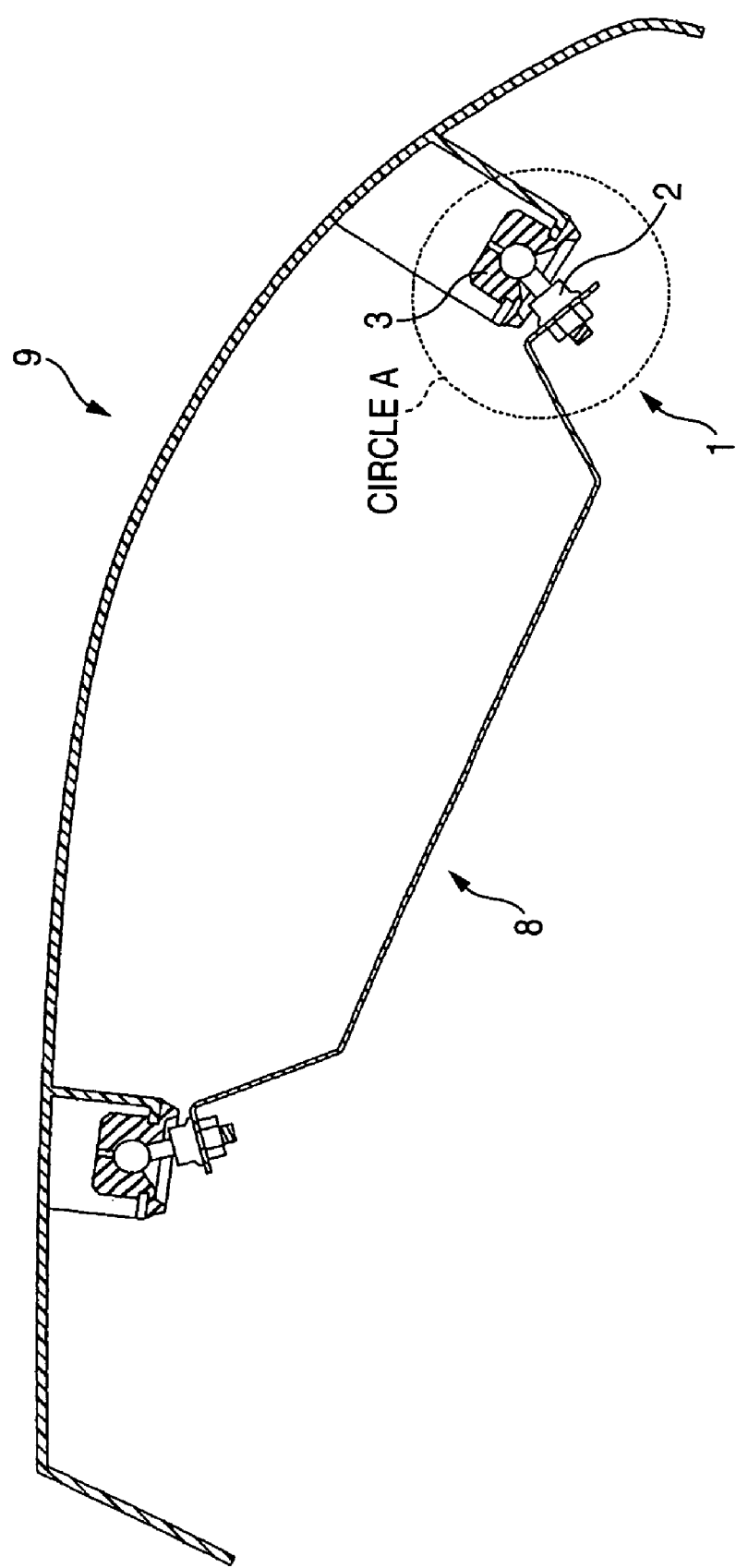
FIG. 3 is a sectional view of the mounting structure for an engine cover in a second embodiment of the invention.
Figure 4:
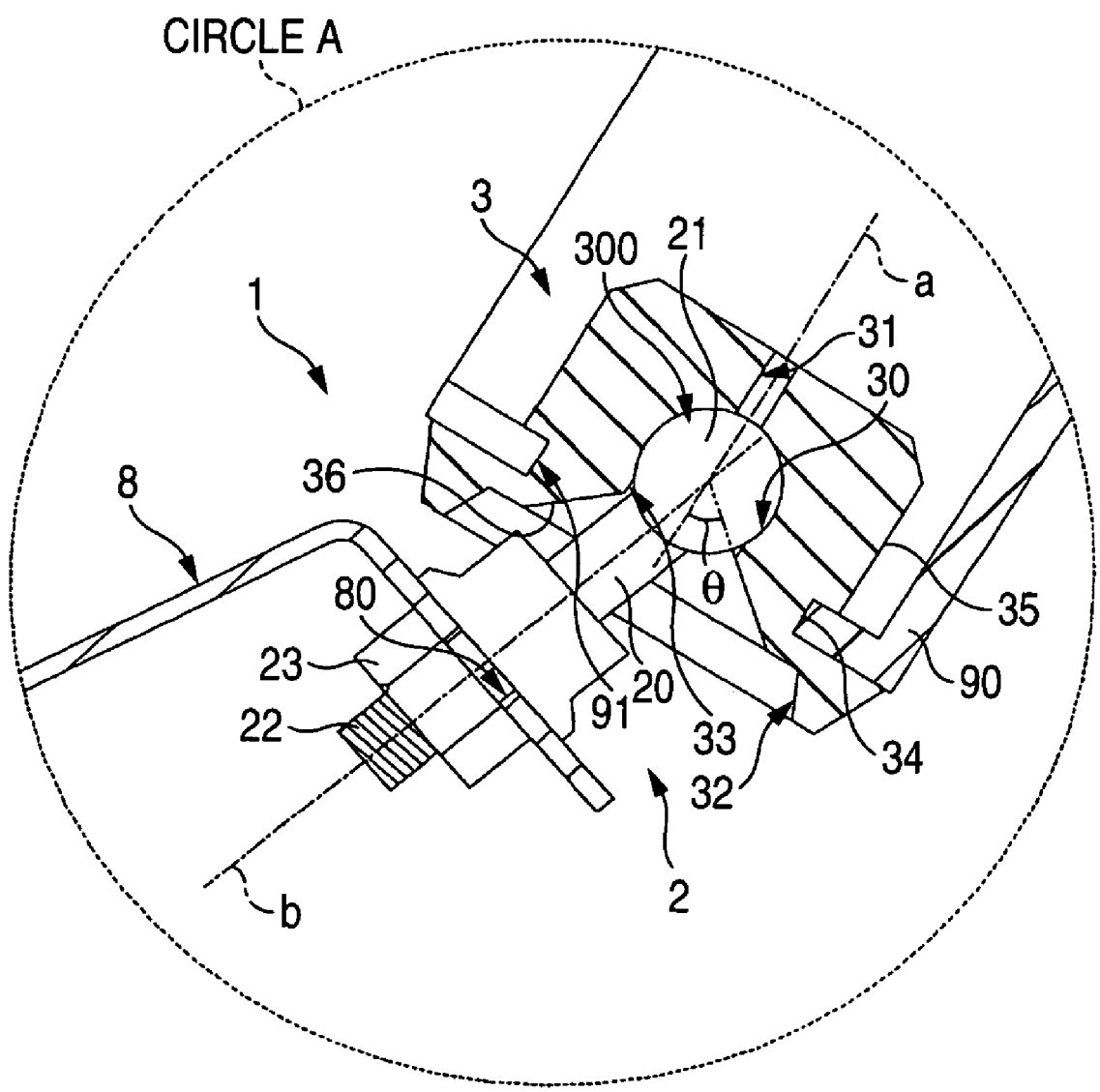
FIG. 4 is an enlarged view of the inner region of Circle A in FIG. 3.

FIG. 3 shows a sectional view of a mounting structure for an engine cover in this embodiment. FIG. 4 shows an enlarged view of inner region of Circle A in FIG. 3. Note that portions corresponding to those in FIG. 1 will be denoted by the same reference numerals.

As shown in FIG. 3, two protruded members 2 are fixed in the bracket 8. Two protruded members 2 are not disposed in parallel. That is, two protruded members 2 are disposed so that axes of the protruded members are intersected. As shown in FIG. 4, a taper surface 36 is formed between an aperture 32 of the recessed member 3 and the press-fit passage 33. The taper surface 36 tapers along with the direction of press-fitting of the protruded member.

The mounting structure 1 in this embodiment has the same advantages as the mounting structure in the first embodiment. In addition, according to the mounting structure 1 in this embodiment, interference between the protruded member 2 and the recessed member 3 can be prevented within the scope in which the taper surface 36 is formed, within which the protruded member 2 can be press-fitted into the recessed member 3 even in case that an axis a of the recessed member 3 and an axis b of the protruded member 2 are not arranged coaxially. In other words, the protruded member 2 can be press-fitted into the recessed member 3 at a slant.

The embodiments of the mounting structure for an engine cover of the invention have been described. However, embodiments are not specifically limited to the above-mentioned embodiments. It is also possible to carry out the invention in various modifications and improvements which those skilled in the art can perform. For example, although the protruded member 2 is arranged in the bracket 8 in the above-mentioned embodiment, it may be arranged in a cylinder block, a cylinder head, or the like. In addition, the leak hole 31 may not be arranged.

In addition, D1, D2, D3, and D4 may be changed according to circumstances within a range which is in agreement with the above-mentioned inequality. A degree of swing of the head 21 can be adjusted by changing these values.

Further, an inclination angle $\theta$ of the taper surface 36, which means the degree of the angle between the taper surface 36 and the reference axis a of the recessed member 3, in the second embodiment is not specifically limited. When the inclination angle of the taper surface 36 is small, an acceptance angle to press-fit of the protruded member 2 becomes small. When the inclination angle of the taper surface 36 is large, the acceptance angle of the protruded member 2 becomes large but it becomes difficult for the head 21 to enter the spherical space 300. The inclination angle of the taper surface 36 can be decided by considering the above-mentioned circumstances.

Additionally, embodiments of the engine cover of the present invention will be hereinafter described.

THIRD EMBODIMENT

Figure 5:
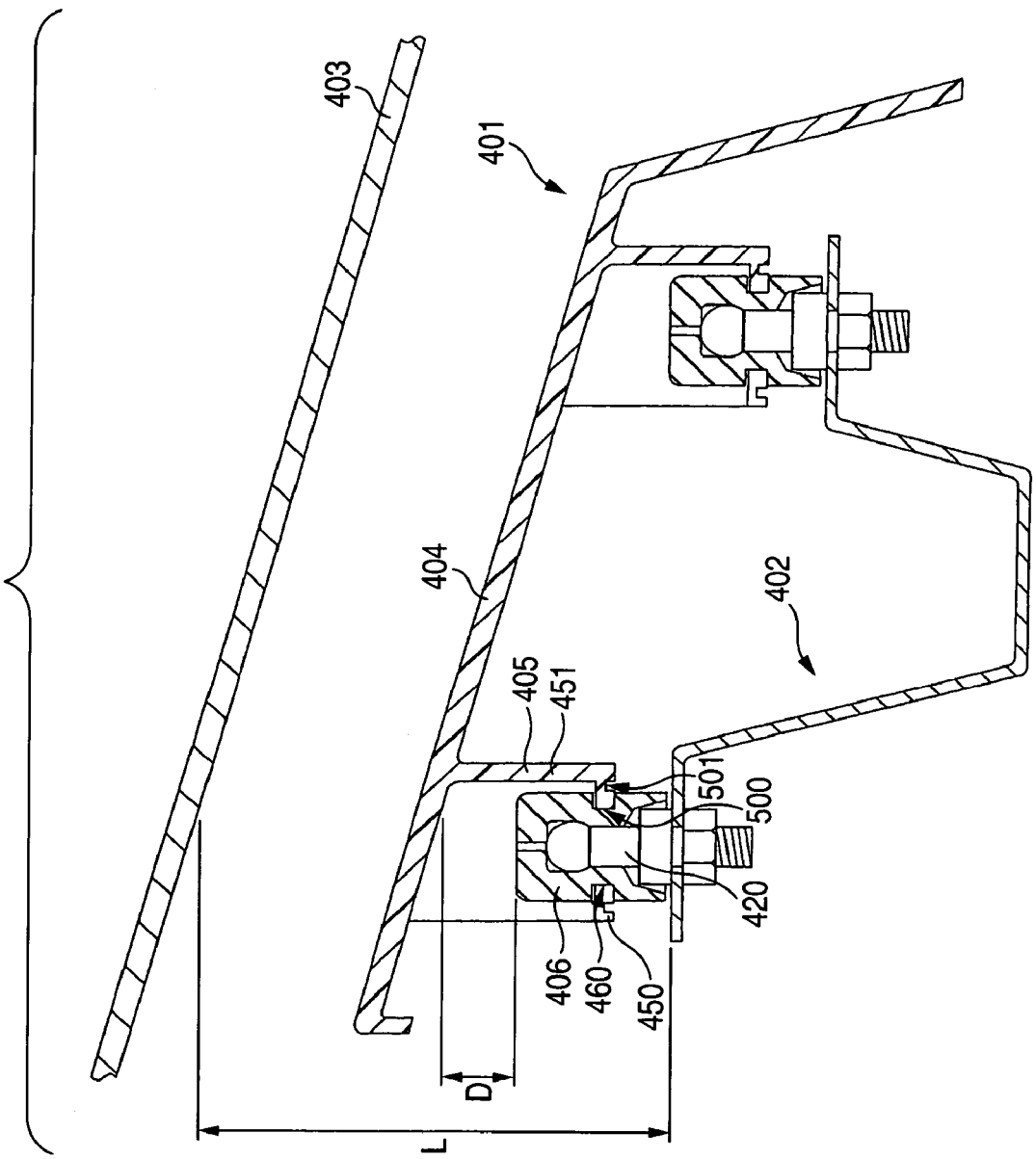
FIG. 5 is a sectional view of an engine cover in a third embodiment of the invention.

First, a constitution of an engine cover in this embodiment will be described. FIG. 5 shows a sectional view of the engine cover in this embodiment. As shown in the figure, the engine cover. 401 covers an upper surface (front surface) of a bracket 402. The bracket 402 is included in the engine side member of the invention. In addition, a hood panel 403 is arranged above the engine cover 401.

The bracket 402 is made of metal and presents a curved plate shape. The bracket 402 is fixed to a cylinder head cover (not shown). A pin 420, which is made of metal and presents a round bar shape, is provided protrudingly from an upper surface of the bracket 402. The pin 420 is included in the engine side engagement section of the invention. Four pins 20 are arranged in total.

The engine cover 401 includes a cover body 404, a mounting seat 405, and a cap 406. The cap 406 is included in the elastic cover side engagement section of the invention. The cover body 404 is made of resin and presents a shallow rectangular tray shape.

Figure 6:
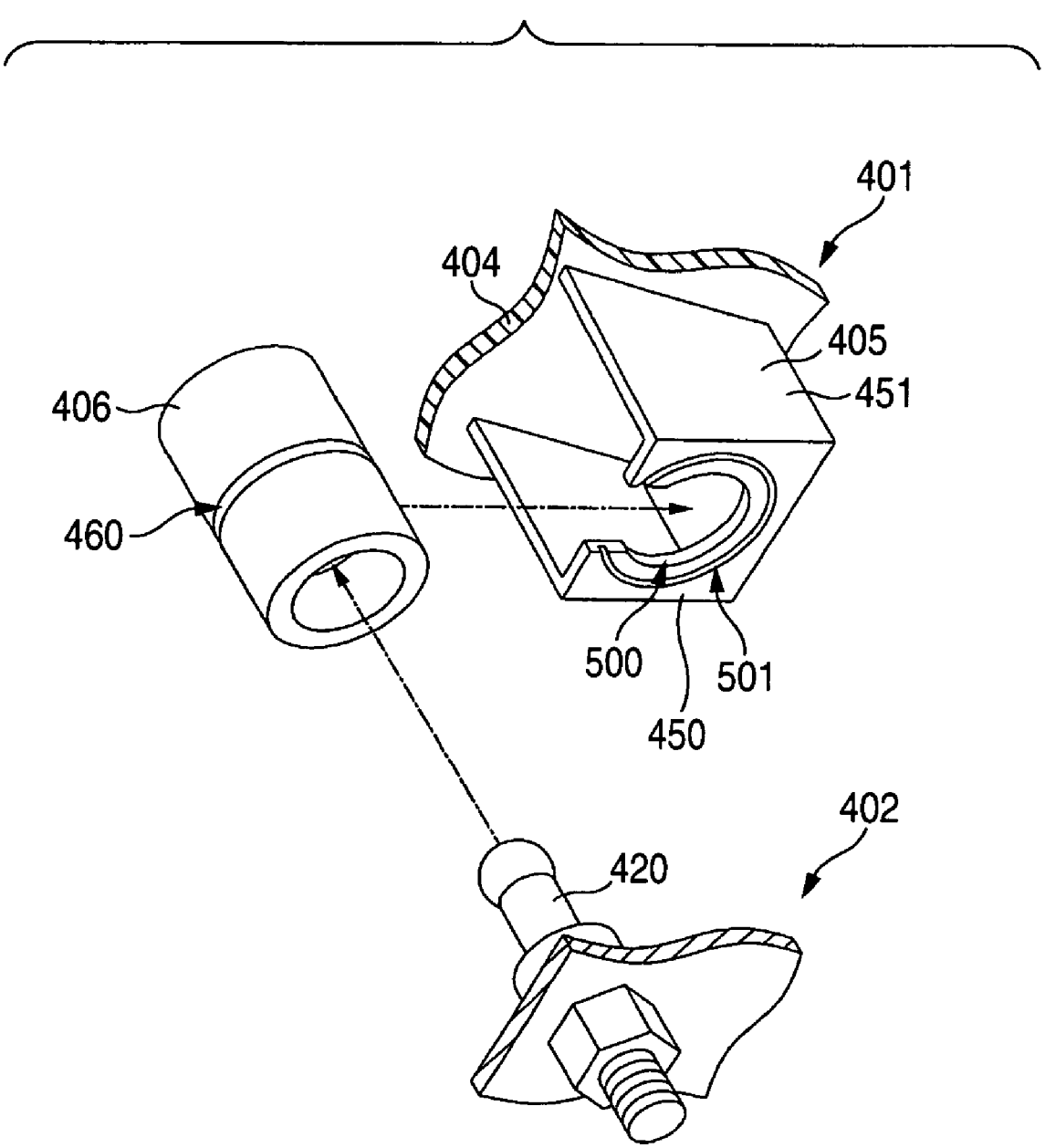
FIG. 6 is an exploded view of a mounting seat, a cap, and a pin on the left side in FIG. 5.

Four mounting seats 5 are arranged in total. FIG. 6 shows an exploded view of the mounting seat, the cap, and the pin on the left side in FIG. 5. As shown in the figure, the mounting seat 405 includes a seat body 450 and a coupling section 451. The mounting seat 405 is formed integrally with the cover body 404. The seat body 450 presents a rectangular plate shape. A cap holding hole 500 is opened in substantially the center of the seat body 450. The cap holding hole 500 presents a circular shape with at one end thereof opened to one side of the seat body 450. A fragile groove 501 is recessed along a hole edge on an external circumference side of the cap holding hole 500. The fragile groove 501 is included in the fragile portion of the invention. The coupling section 451 couples three sides, where the cap holding hole 500 is not opened, in the seat body 450 and a lower surface (rear surface) of the c over body 404.

The cap 406 is made of rubber and presents a bottomed cylindrical shape opening downward. An engagement groove 460 is circumferentially arranged in substantially the center in a longitudinal direction of an external circumferential surface of the cap 406. The cap 406 is press-fitted in the cap holding hole 500 from the opening which is opened on one side of the seat body 450. The hole edge of the cap holding hole 500 is press-fitted in the engagement groove 460 and locked. The pin 420 is press-fitted in the inside of the cap 406. The engine cover 401 is detachably locked to the bracket 402 by press-fitting the pin 420. Referring back to FIG. 5, a compression space D is defined between an upper surface of the cap 406 and a lower surface of the cover body 404. In addition, a shock absorbing space L is defined between an upper surface of the bracket 402 and a lower surface of the hood panel 403.

Figure 7:
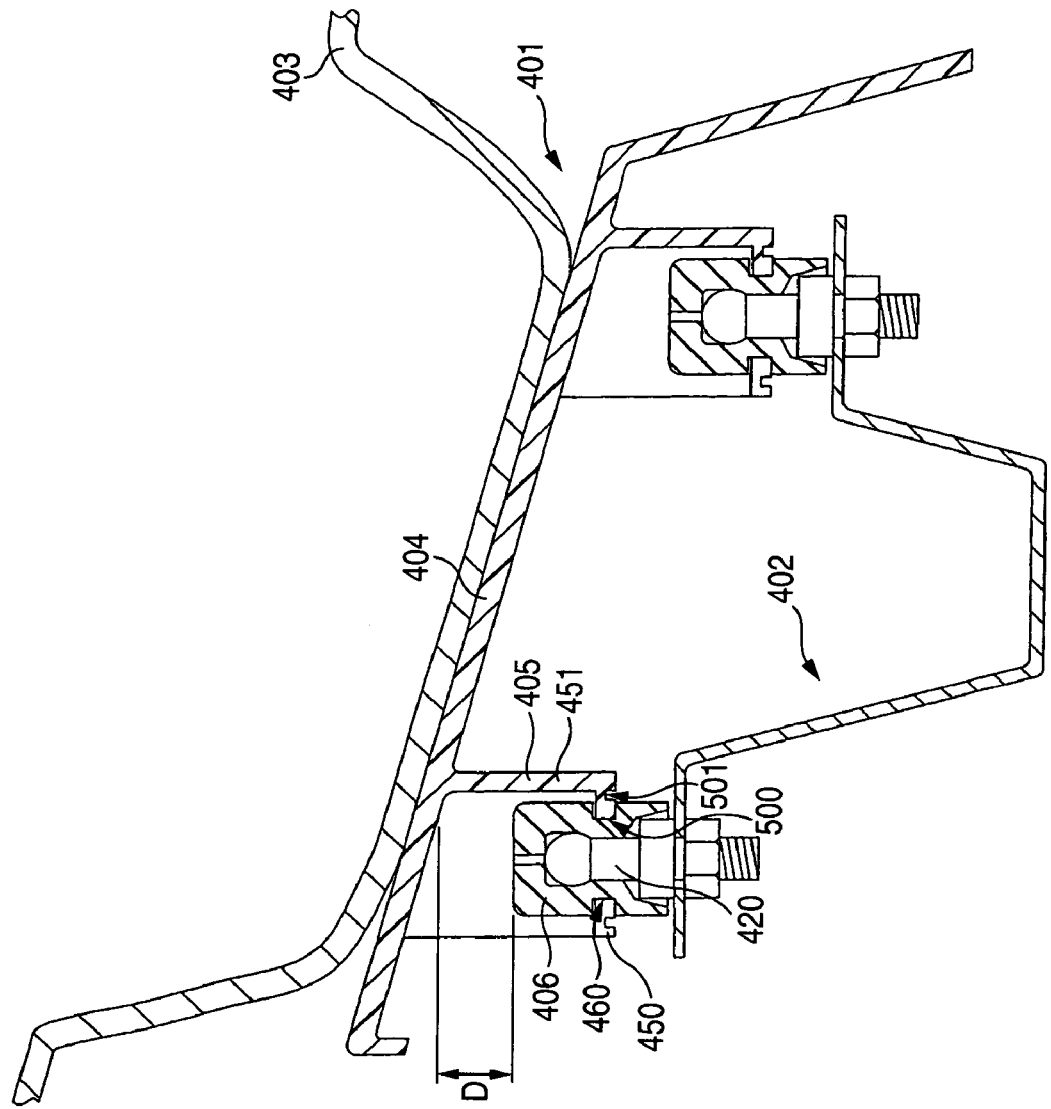
FIG. 7 is a sectional view showing a state of the engine cover of the third embodiment in the case in which a collision load is small.

Next, a movement of the engine cover in this embodiment in the case in which a collision load is applied thereto will be described. For example, in the case in which an object of collision such as a pedestrian is hit to fall on the hood panel 403, a collision load is applied in a front and rear direction of the hood panel 403, that is, a front and rear direction of the cover body 404. FIG. 7 shows a state of the engine cover in the case in which the collision load is small. In the case in which the collision load is small, a total amount of collision energy is absorbed by deformation of the hood panel 403 and elastic deformation of the cap 406. Therefore, the compression space D is not compressed.

Figure 8:
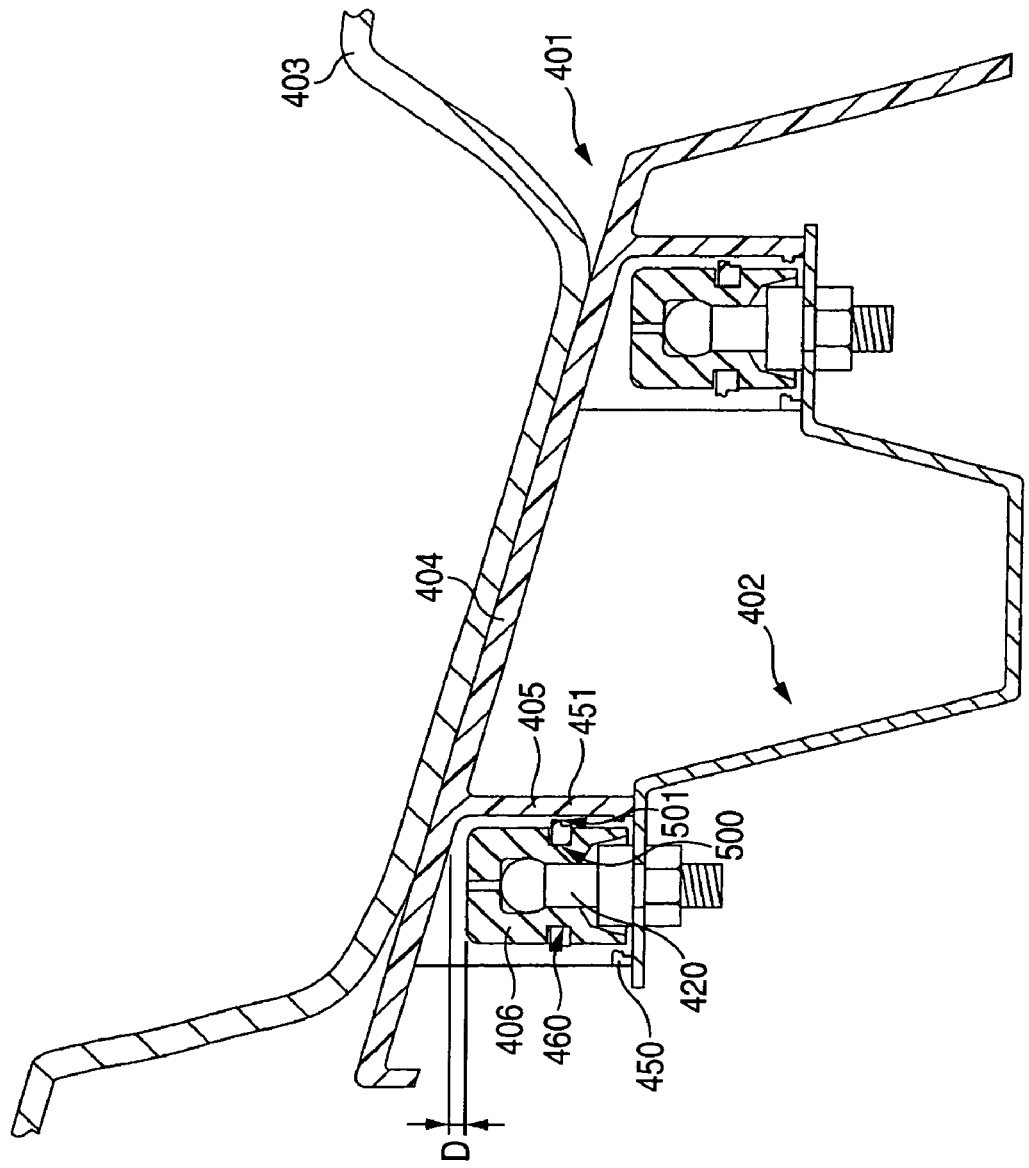
FIG. 8 is a sectional view showing a state of the engine cover of the third embodiment in the case in which the collision load is medium.

FIG. 8 shows a state of the engine cover in the case in which the collision load is medium. In the case in which the collision load is medium, the seat body 450 is broken with the fragile groove 501 as a boundary. That is, a portion where the fragile groove 501 is arranged in the seat body 450 is thinner than the other portions. In other words, the portion where the fragile groove 501 is arranged has low rigidity than the other portions. Consequently, the portion where the fragile groove 501 is arranged is broken preferentially over the other portions. Then, a portion further on the internal circumference side than the fragile groove 501 of the seat body 450 relatively sinks into the mounting seat 405 together with the cap 406. The compression space D is compressed by this sinking. A total amount of collision energy is absorbed by the breaking of the seat body 450 and the compression of the compression space D in addition to the movement of FIG. 7.

Figure 9:
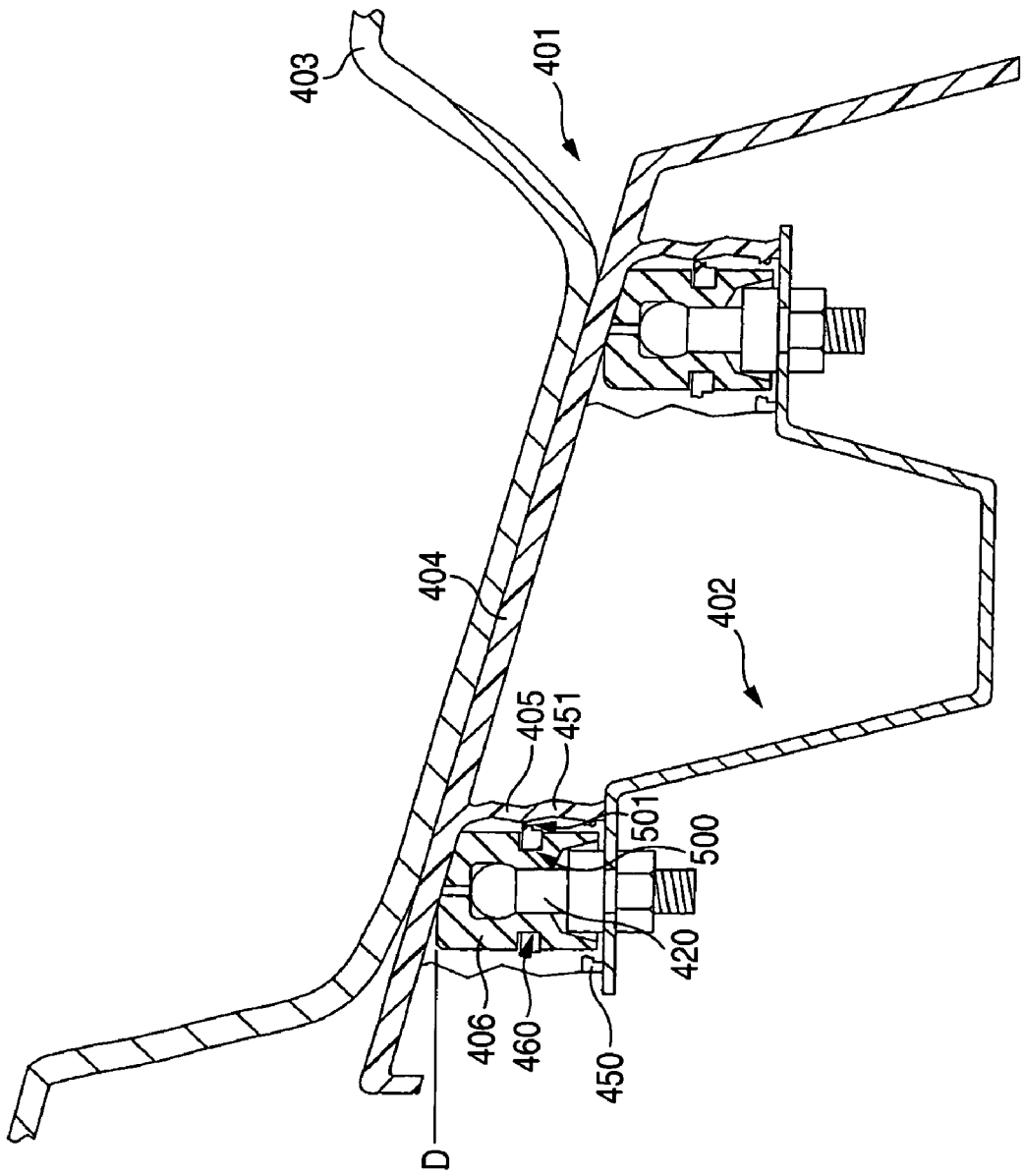
FIG. 9 is a sectional view showing a state of the engine cover of the third embodiment in the case in which the collision load is large.

FIG. 9 shows a state of the engine cover in the case in which the collision load is large. In the case in which the collision load is large, after the movement of FIG. 8, the compression space D is further compressed until the space is entirely lost. Then, the coupling section 451 is buckled. In addition, the cap 406 is pressed against the lower surface of the cover body 404 to elastically deform. A total amount of collision energy is absorbed by the buckling of the coupling section 451 and the elastic deformation of the cap 406 in addition to the movements of FIGS. 3 and 4.

According to the engine cover 401 in this embodiment, the shock absorbing space L, which has decreased by the space occupied by the engine cover 401, can be partially recovered by the compression space D. Consequently, an amount of collision energy absorption increases by the compression space D.

In addition, according to the engine cover 401 in this embodiment, for example, shock absorbing means or the like is not mounted on the upper surface of the engine cover. Therefore, the engine cover 401 in this embodiment has a high design characteristic. Further, in the engine cover 401 in this embodiment, ports are opened easily.

In addition, the compression space D of the engine cover 401 in this embodiment is defined using the mounting seat 405. In other words, the mounting seat 405 has both a role of locking the engine cover 401 to the bracket 402 and a role of defining the compression space D. Therefore, according to the engine cover 401 in this embodiment, a fewer number of components are sufficient compared with the case in which components for defining the compression space D are arranged separately from the mounting seat.

In addition, according to the engine cover 401 in this embodiment, the cap 406 is arranged as the elastic cover side engagement section. The cap 406 starts elastic deformation with a collision load smaller than the collision load with which the fragile groove 501 is broken. Then, in the case in which the collision load is small, a total amount of collision energy can be absorbed by the elastic deformation (see FIG. 7). Therefore, according to the engine cover 401 in this embodiment, in the case in which the collision load is small, the mounting seat 405 is not destroyed. Consequently, not only the mounting seat 405 but also the engine cover 401 after collision can be reused.

Further, the cap 406 also elastically deforms not only in the case in which the collision load is small but also in the case in which the collision load is large (see FIG. 9). Then, collision energy is absorbed by the elastic deformation. In this regard, again, the engine cover 401 in this embodiment has a large amount of collision energy absorption.

Moreover, according to the engine cover 401 in this embodiment, the fragile groove 501 is arranged in the seat body 450. Consequently, the compression space D. can be operated surely. In addition, the same fragile groove 501 is arranged in the four mounting seats 5. Consequently, the compression spaces D of the four mounting seats 5 can be operated with substantially the same collision load. Further, the breaking load of the fragile groove 501 can be adjusted easily by changing, for example, a groove width or a groove depth. Therefore, an operation load of the compression space D can be set freely.

FOURTH EMDODIMENT

Figure 10:
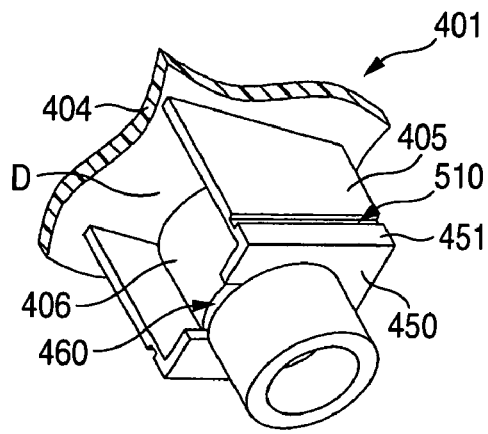
FIG. 10 is an enlarged view of the vicinity of a mounting seat of an engine cover in a fourth embodiment of the invention.

This embodiment is different from the first embodiment in that a fragile groove is arranged in a coupling section. Therefore, only the difference will be described here. FIG. 10 shows an enlarged view of the vicinity of a mounting seat of an engine cover in this embodiment. Note that portions corresponding to those in FIG. 6 are denoted by the same reference numerals. In addition, for convenience of description, a bracket is not shown.

As shown in the figure, a fragile groove 510 is recessed in the vicinity of a lower end on an external surface of the coupling section 451. The fragile groove 510 extends in a C shape on all three walls of the coupling section 451. As shown in FIG. 8, in the case in which the collision load is medium, the coupling section 451 is buckled with the fragile groove 510 as a boundary. Then, a portion lower than the fragile groove 510 of the coupling section 451 and the cap 406 relatively sink into the mounting seat 405. In other words, the compression space D is compressed. The engine cover 401 in this embodiment has the same advantages as the engine cover in the first embodiment.

FIFTH EMBODIMENT

Figure 11:
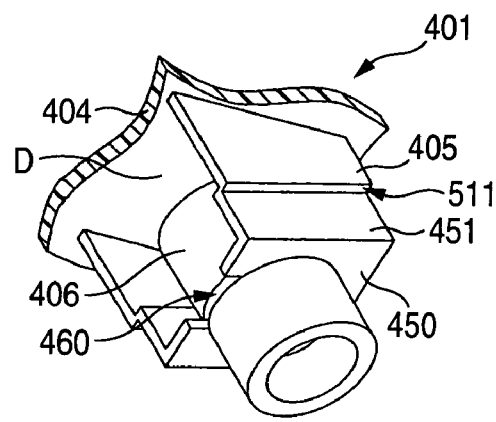
FIG. 11 is an enlarged view of the vicinity of a mounting seat of an engine cover in a fifth embodiment of the invention.

This embodiment is different from the third embodiment in that a fragile step is arranged in a coupling section instead of the fragile groove. Therefore, only the difference will be described here. FIG. 11 shows an enlarged view of the vicinity of a mounting seat of an engine cover in this embodiment. Note that portions corresponding to those in FIG. 6 will be denoted by the same reference numerals. In addition, for convenience of description, a bracket is not shown.

As shown in the figure, a fragile step 511 narrowing downward is formed in the middle of an external surface of the coupling section 451. The fragile step 511 extends in a C shape on all three walls of the coupling section 451. A portion where the fragile step 511 is arranged in the coupling section 451 is formed thinner than the other portions. In addition, an outside dimension of a portion lower than the fragile step 511 is set smaller than an inside dimension of a portion higher than the fragile step 511. As shown in FIG. 8, in the case in which the collision load is medium, the coupling section 451 is broken with the fragile step 511 as a boundary. Then, the portion lower than the fragile step 511 of the coupling section 451 and the cap 406 relatively sink into the mounting seat 405. In other words, the compression space D is compressed. The engine cover 401 in this embodiment has the same advantages as the engine cover in the third embodiment.

SIXTH EMBODIMENT

Figure 12:
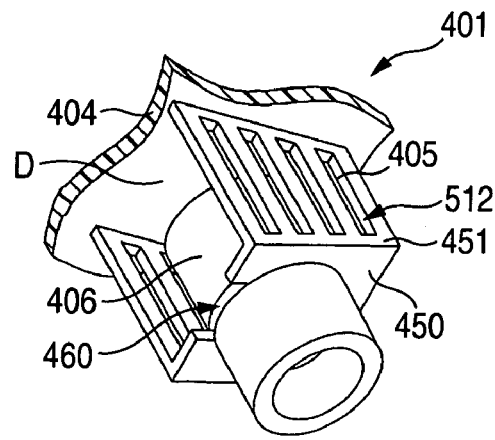
FIG. 12 is an enlarged view of the vicinity of a mounting seat of an engine cover in a sixth embodiment of the invention.

This embodiment is different from the third embodiment in that fragile slits are arranged in a coupling section instead of the fragile groove. Therefore, only the difference will be described here. FIG. 12 shows an enlarged view of the vicinity of a mounting seat of an engine cover in this embodiment. Note that portions corresponding to those in FIG. 6 will be denoted by the same reference numerals. In addition, for convenience of description, a bracket is now shown.

As shown in the figure, fragile slits 512 extending in the vertical direction are formed in the coupling section 451. Four fragile slits 512 are arranged on each wall of the coupling section 451, and twelve fragile slits 512 are arranged in total. A portion where the fragile slits 512 are arranged in the coupling section 451 has a smaller cross section than other portions, that is, the upper end and the lower end of the coupling section 451. As shown in FIG. 8, in the case in which the collision load is medium, the coupling section 451 is buckled with the fragile slits 512 as a boundary. Then, the portion lower than the buckled portion of the coupling section 451 and the cap 406 relatively sink into the mounting seat 405. In other words, the compression space D is compressed. The engine cover 401 in this embodiment has the same advantages as the engine cover in the third embodiment.

SEVENTH EMBODIMENT

Figure 13:
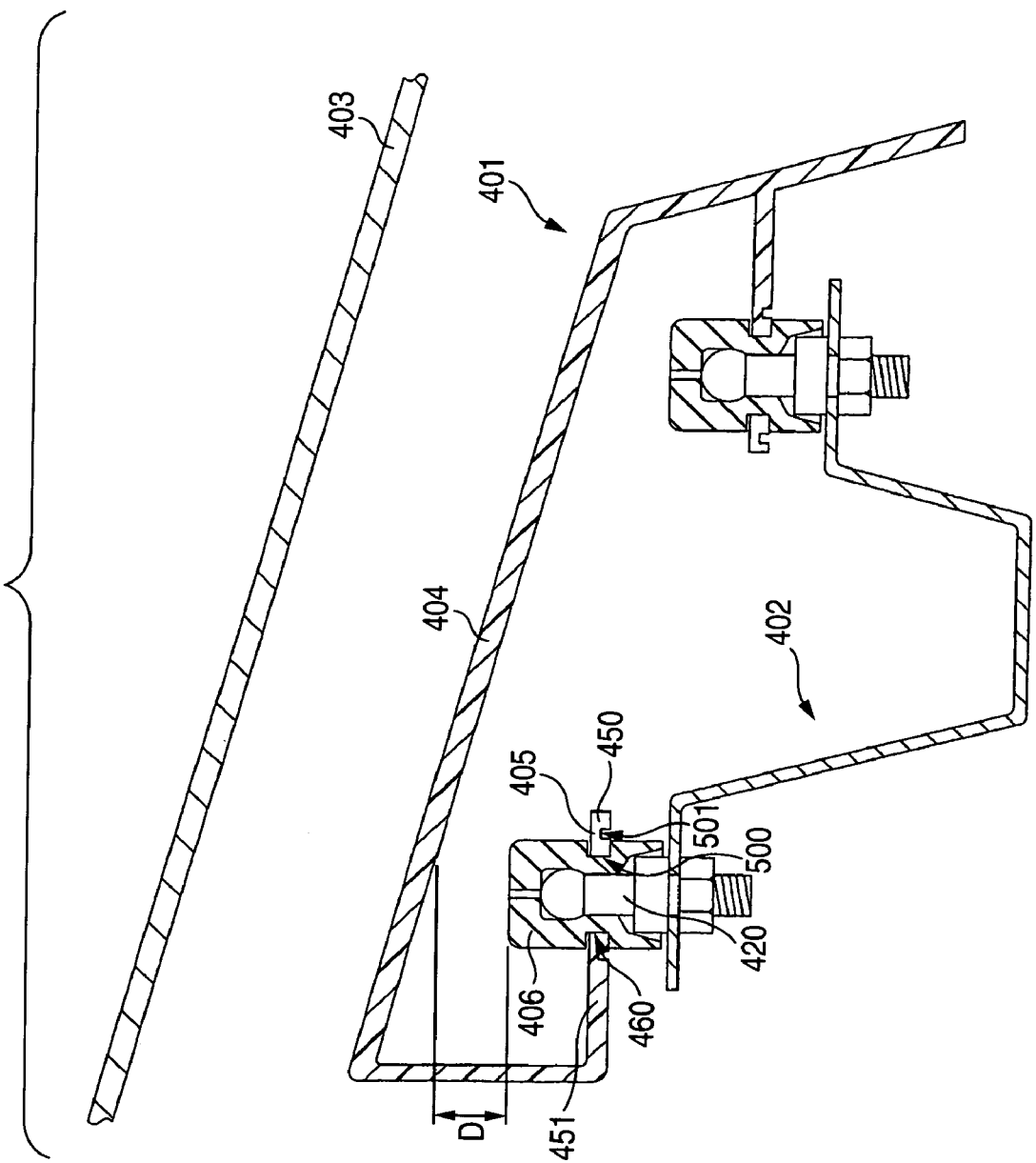
FIG. 13 is a sectional view of an engine cover in a seventh embodiment of the invention.
Figure 14:
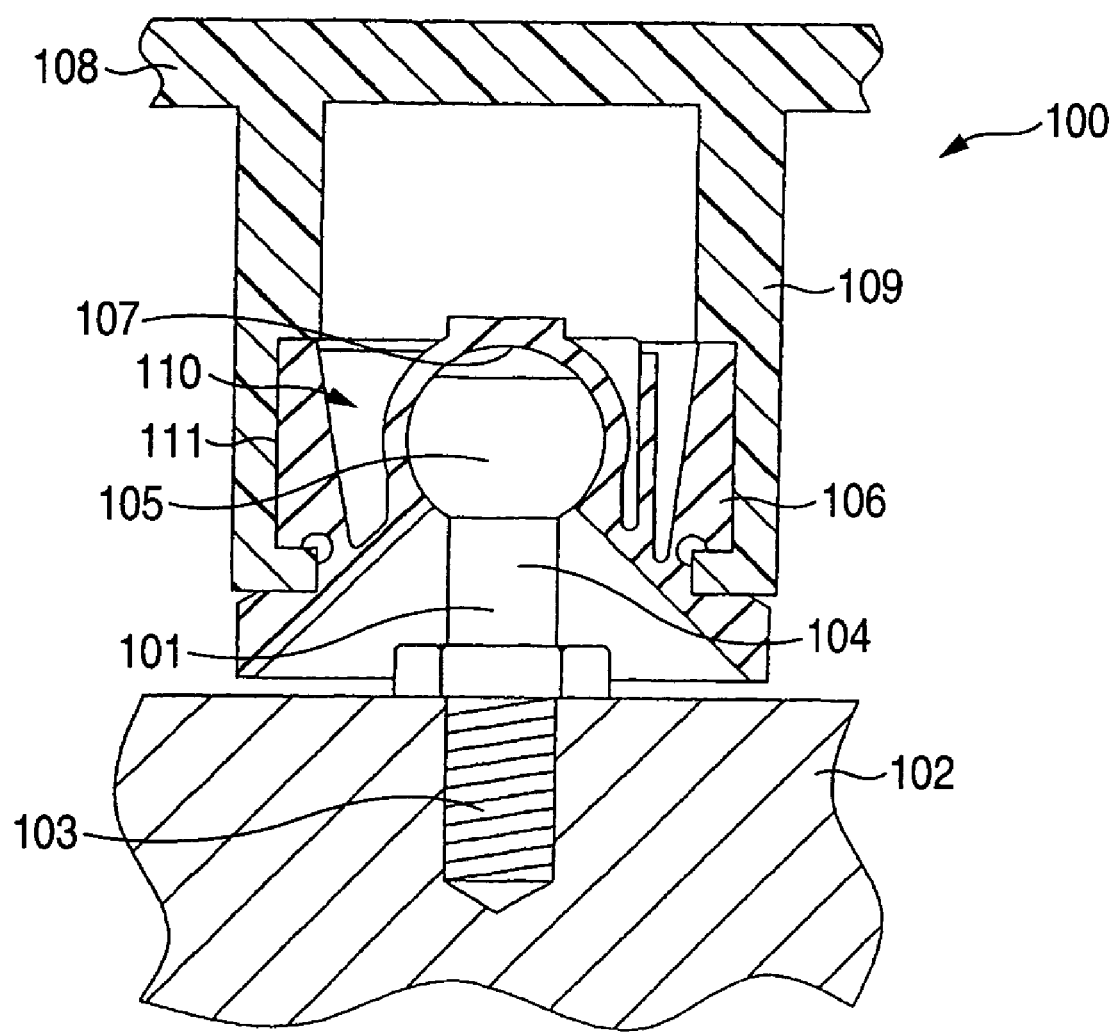
FIG. 14 is a sectional view of a conventional mounting structure for an engine cover.
Figure 15:
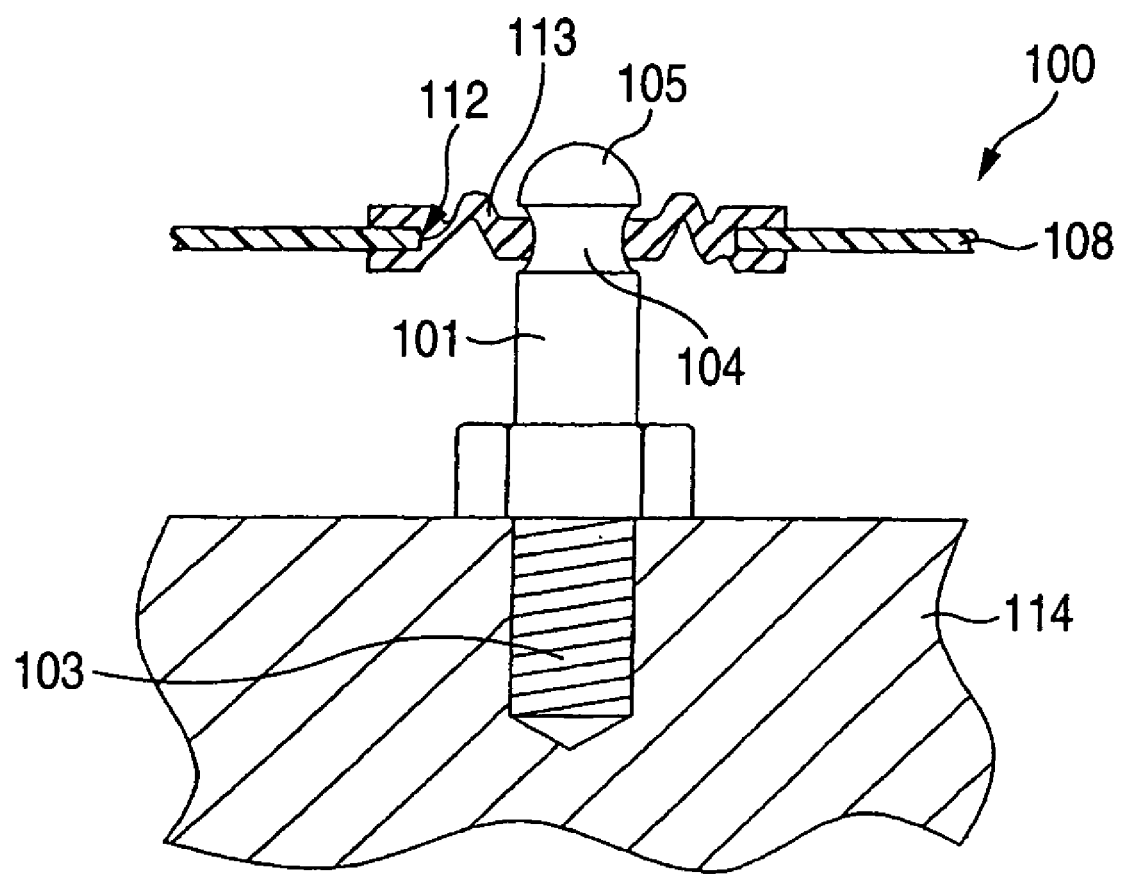
FIG. 15 is a sectional view of another conventional mounting structure for an engine cover.

This embodiment is different from the third embodiment in that a coupling section is provided vertically from a sidewall of a cover body. Therefore, only the difference will be described here. FIG. 13 shows a sectional view of an engine cover in this embodiment. Note that portions corresponding to those in FIG. 5 are denoted by the same reference numerals.

As shown in the figure, the seat body 450 is arranged below the cover body 404. The coupling section 451 couples the seat body 450 and a sidewall of the cover body 404. As shown in FIG. 4, in the case in which the collision load is medium, the seat body 450 is broken with the fragile groove 501 as a boundary. Then, a portion further on the internal circumference side than the fragile groove 501 of the seat body 450 and the cap 406 relatively move toward the lower surface of the cover body 404. In other words, the compression space D is compressed. The engine cover 401 in this embodiment has the same advantages as the engine cover in the third embodiment. In addition, according to the engine cover 401 in this embodiment, the coupling section 451 is provided vertically from the sidewall of the cover body 404. In other words, the coupling section 451 extends substantially vertically with respect to the front and rear direction of the cover body 404. Consequently, it is less likely that the coupling section 451 acts on an object of collision just like a prop.

The embodiments of the engine cover of the invention have been described above. However, embodiments are not specifically limited to the above-mentioned embodiments. It is also possible to carry out the invention in various modifications and improvements which those skilled in the art can perform.

For example, a structure of the fragile portion is not specifically limited. In addition, the number of arranged fragile portions is not specifically limited. In this case, destruction loads of the plural fragile portions may be set to load values different from each other. In this manner, the plural fragile portions are destroyed in order, whereby collision energy can be absorbed stepwise. Therefore, a reaction force of a collision load applied to an object of collision is reduced. In addition, an elastically deformed portion may be arranged instead of the fragile portion. In other words, for example, the coupling section 451 shown in FIG. 6 may be formed of an elastic material in a bellows shape. In addition, the pin 420 may be formed of an elastic material. Further, it is possible to incorporate the structure of compression space, the cover side engagement section, and the mounting seat described in one of third to seventh embodiments into the first and second embodiment. It is also possible to provide the compression space L or D as shown in FIG. 1.

According to the invention, an engine cover can be provided which has a large amount of collision energy absorption and a high design characteristic, and in which ports are opened easily.

What is claimed is:

1. A mounting structure for an engine cover comprising:
    a protruded member which is provided protrudingly from a front surface of an engine side member and has a neck and a head with a larger diameter than the neck; and
    a recessed member which has an external circumferential surface small diameter section to be locked to a mounting hole of a mounting seat, which is arranged so as to be opposed to the protruded member, on a rear surface side of the engine cover, a press-fit passage holding the head of the press-fit protruded member on an internal circumference side of the external circumferential surface small diameter section, and a concave communicating with a depth end of the press-fit passage and defining a holding space for holding the head of the press-fit protruded member, wherein in the protruded member, at least a portion surrounding the concave is formed solid;

in a press-fit position, the head is arranged closer to the rear surface of the engine cover than the mounting hole; and when it is assumed that an inner diameter of the mounting hole is D1, an outer diameter of the head is D2, an outer diameter of the external circumferential surface small diameter section before locking the mounting hole is D3, and an inner diameter of the press-fit passage before press-fitting the protruded member is D4, D1, D2, D3, and D4 satisfy an inequality D1<D2+(D3−D4).

2. A mounting structure for an engine cover according to claim 1, wherein a leak hole, which permits the air compressed by press-fitting the protruded member to escape from the holding space to the outside, is drilled in the portion surrounding the concave.

3. A mounting structure for an engine cover according to claim 1, wherein a taper is formed such that a taper surface, which tapers along with the direction of press-fitting of the protruded member, is continued so that the protruded member can be press-fit at a slant against the recessed member in the front side of the press-fit passage of the protruded member.

4. A mounting structure for an engine cover according to claim 1, wherein a press-fit rate (%)=(D2−(D1−(D3−D4)))/(D3−D4)×100 is set in a range from 2% to 35%.

5. A mounting structure for an engine cover according to claim 1, wherein a thickness rate (%)=(D3−D4)/(2×D2)×100 is set in a range from 40% to 80%.

6. A mounting structure for an engine cover according to claim 1, wherein a compression space, which is compressed in the case in which a collision load equal to or larger than a predetermined value is applied in a front and rear direction of the engine cover, is defined between the protruded member and the rear surface of the engine cover.

7. A mounting structure for an engine cover according to claim 6, wherein the mounting seat is an elastic cover side engagement section which starts elastic deformation when a collision load smaller than the predetermined value is applied thereto.

8. A mounting structure for an engine cover according to claim 6, wherein the mounting seat has a fragile portion which is destroyed in the case in which a collision load equal to or larger than the predetermined value is applied thereto.

9. A mounting structure for an engine cover according to claim 8, wherein the fragile portion includes a fragile groove formed in the vicinity of a center of a bottom surface of the mounting seat.

10. A mounting structure for an engine cover according to claim 8, wherein the fragile portion includes a fragile groove formed in the vicinity of a lower end on an external surface of the mounting seat.

11. A mounting structure for an engine cover according to claim 8, wherein the fragile portion includes a fragile step formed in the middle of an external surface of the mounting seat.

12. A mounting structure for an engine cover according to claim 8, wherein the fragile portion includes a fragile slits arranged in the mounting seat.

13. A mounting structure for an engine cover according to claim 8, wherein the mounting seat is provided vertically from a sidewall of the engine cover.

14. An engine cover comprising:

a cover body which covers an engine side member having an engine side engagement section arranged on a front surface thereof;

a mounting seat which has a seat body arranged so as to be opposed to the engine side engagement section on a rear side of the cover body and a coupling section coupling the seat body and the cover body; and a cover side engagement section which is locked to the seat body and engages with the engine side engagement section, wherein a compression space, which is compressed in the case in which a collision load equal to or larger than a predetermined value is applied in a front and rear direction of the cover body, is defined between the cover side engagement section and the rear surface of the cover body, at least one of the seat body and the coupling section having a fragile portion with a rigidity less than a rigidity of portions in the seat body and the coupling section other than the fragile portion, the fragile portion being destroyed when a collision load equal to or larger than the predetermined value is applied thereto, and wherein the predetermined value is a collision load which begins to destroy the fragile portion.

15. An engine cover according to claim 14, wherein the cover side engagement section is an elastic cover side engagement section which starts elastic deformation when a collision load smaller than the predetermined value is applied thereto.

* * * * *